US009283873B2

(12) United States Patent
Line et al.

(10) Patent No.: US 9,283,873 B2
(45) Date of Patent: Mar. 15, 2016

(54) FLEX AND FOLD VEHICLE SEATING ASSEMBLY

(71) Applicant: Ford Global Technologies, LLC, Dearborn, MI (US)

(72) Inventors: Johnathan Andrew Line, Northville, MI (US); Dumitru Dan Nae, Troy, MI (US); Curtis Stanhope, Pinckney, MI (US); Kurt Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 13/717,351

(22) Filed: Dec. 17, 2012

(65) Prior Publication Data

US 2014/0167466 A1    Jun. 19, 2014

(51) Int. Cl.
*B60N 2/02* (2006.01)
*B60N 2/30* (2006.01)
*B60N 2/36* (2006.01)

(52) U.S. Cl.
CPC .............. *B60N 2/3065* (2013.01); *B60N 2/309* (2013.01); *B60N 2/3093* (2013.01); *B60N 2/36* (2013.01)

(58) Field of Classification Search
CPC ............................... B60N 2/305; B60N 2/3011
USPC ........................... 297/324, 331, 334, 335, 340
See application file for complete search history.

(56) References Cited

U.S. PATENT DOCUMENTS

| | | |
|---|---|---|
| 5,941,602 A | 8/1999 | Sturt et al. |
| 6,767,063 B1 | 7/2004 | Abdella et al. |
| 6,863,330 B2 | 3/2005 | Yokoyama et al. |
| 6,935,691 B1 | 8/2005 | Sasaki et al. |
| 7,188,883 B2 | 3/2007 | Van Dyk et al. |
| 7,350,867 B2 | 4/2008 | Park |
| 8,882,197 B2 * | 11/2014 | Line et al. ..................... 297/334 |
| 2007/0296258 A1 | 12/2007 | Calvert et al. |
| 2009/0256379 A1 * | 10/2009 | Yamada et al. ............ 296/65.08 |
| 2010/0308619 A1 | 12/2010 | Hoge et al. |
| 2012/0056459 A1 | 3/2012 | Harden |

FOREIGN PATENT DOCUMENTS

GB          2441624 B      8/2010

* cited by examiner

*Primary Examiner* — Matthew Ing
(74) *Attorney, Agent, or Firm* — Vichit Chea; Price Heneveld LLP

(57) ABSTRACT

A vehicle seating assembly includes a seatback and a rear bracket pivotally supporting the seatback and slidably engaging a track assembly. A seat has a four-bar linkage that includes a top link for supporting a cushion, a bottom link, a rear link pivotally coupling a rearward portion of the top link with a rearward portion of the bottom link, and a front link pivotally coupling a forward portion of the top link with a forward portion of the bottom link. A connecting member pivotally couples the bottom link with the seatback. Pivoting the seatback forward about the rear bracket causes the connecting member to collapse the linkage rearward to a stowed position. A base member pivotally couples an intermediate portion of the front link with a fixed front bracket. Sliding the seatback forward causes the seat to pivot upward about the base member to a rear access position.

18 Claims, 16 Drawing Sheets

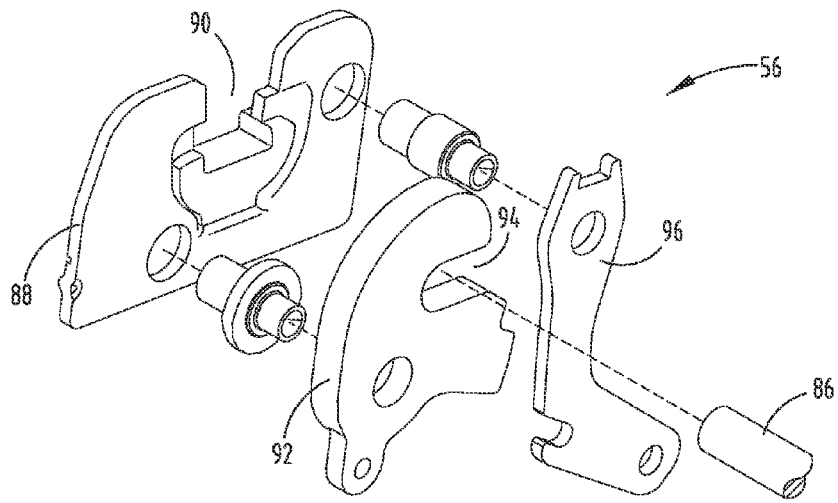
FIG. 9A
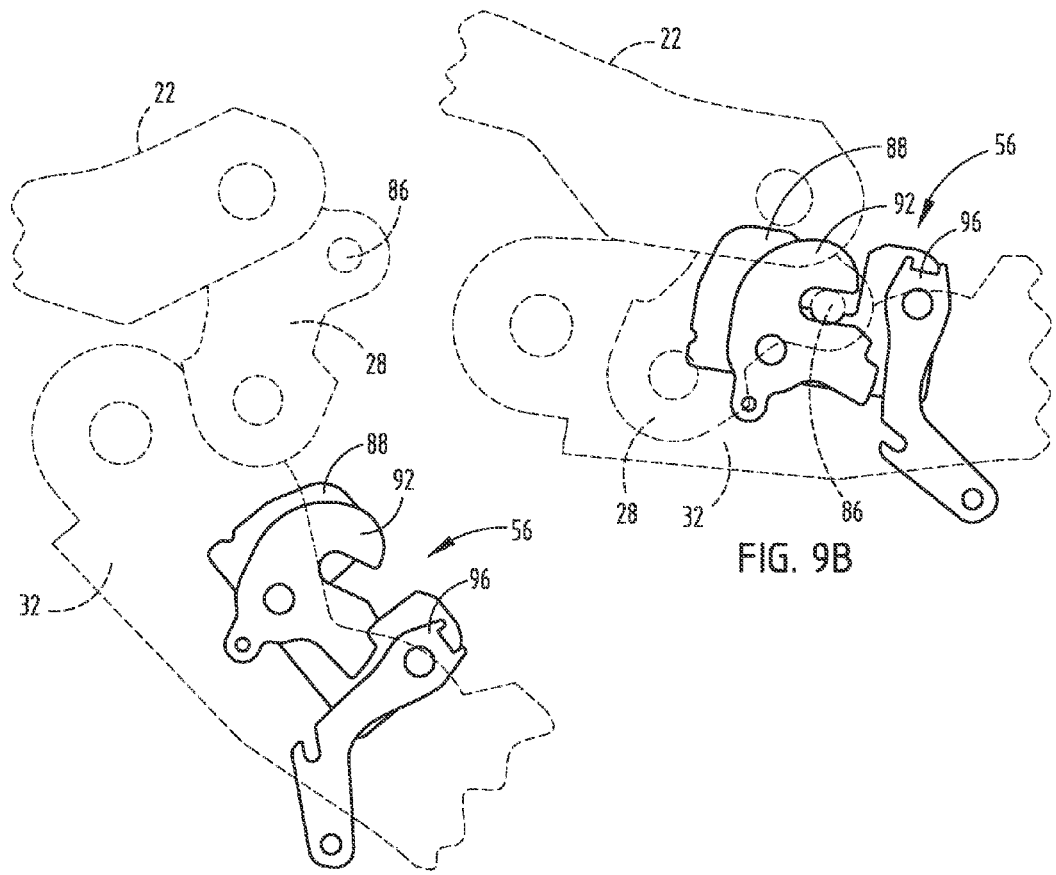
FIG. 9B
FIG. 9C

US 9,283,873 B2

FLEX AND FOLD VEHICLE SEATING ASSEMBLY

FIELD OF THE INVENTION

The present invention generally relates to a vehicle seating assembly, and more particularly to a flex and fold vehicle seating assembly with a four-bar linkage movable to a stowed position and a rear access position.

BACKGROUND OF THE INVENTION

Vehicle seat assemblies are increasingly being adapted with features to slide and fold portions of the seat assembly to a variety of configurations. These features are typically aimed at providing increased vehicle storage capacity and rear seat accessibility, allowing vehicle sizes to be reduced while maintaining interior vehicle storage and seating capacity.

SUMMARY OF THE INVENTION

According to one aspect of the present invention, a vehicle seating assembly includes a seatback and a rear bracket pivotally supporting the seatback. The rear bracket is slidably engaged with a track assembly. A seat is positioned substantially orthogonal to the seatback in an upright position and has a four-bar linkage. The four-bar linkage includes a top link for supporting a cushion, a bottom link extending below the top link, a rear link pivotally coupling a rearward portion of the top link with a rearward portion of the bottom link, and a front link pivotally coupling a forward portion of the top link with a forward portion of the bottom link. A connecting member pivotally couples the bottom link with the seatback. Pivoting the seatback forward about the rear bracket causes the connecting member to collapse the linkage rearward to a stowed position defined by the bottom link in closer proximity to the top link. A base member pivotally couples an intermediate portion of the front link with a fixed front bracket. Sliding the seatback forward causes the connecting member to pivot the seat upward about the base member to a rear access position defined by the cushion facing forward.

According to another aspect of the present invention, a vehicle seating assembly includes a seatback pivotally coupled with a slidable rear bracket. A seat has a four-bar linkage. A base member pivotally couples a front link of the linkage with a fixed front bracket. A connecting member pivotally couples a bottom link of the linkage with the seatback. Pivoting the seatback forward collapses the linkage, and sliding the seatback forward rotates the linkage forward.

According to yet another aspect of the present invention, a vehicle seating assembly includes a slidable bracket pivotally supporting a seatback. A four-bar linkage has a top link, a bottom link, and a front link. The top link supports a cushion. The bottom link has a connecting member pivotally coupling the seatback with the bottom link. Pivoting the seatback forward collapses the linkage rearward. The front link has a base member pivotally coupling the front link with a fixed bracket. Sliding the seatback forward tips the cushion forward.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9A is an exploded top perspective view of the latch assembly;

FIG. 9B is a side elevational view of the latch assembly in a closed position, showing portions of the linkage assembly in dashed lines;

FIG. 9C is a side elevational view of the latch assembly in an open position, showing portions of the linkage assembly in dashed lines;

DETAILED DESCRIPTION OF THE EMBODIMENTS

Figure 1:
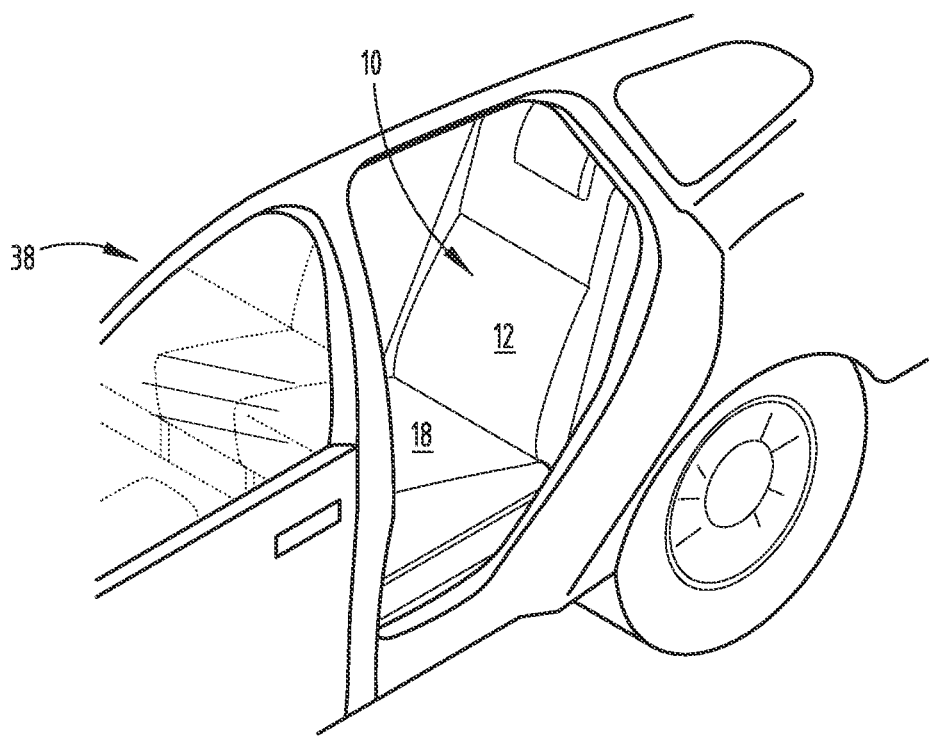
FIG. 1 is a top perspective view of a portion of a vehicle seating assembly in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a vehicle seating assembly that includes a seatback 12 and a rear bracket 14 pivotally supporting the seatback 12.

The rear bracket 14 is slidably engaged with a track assembly 16. A seat 18 is positioned substantially orthogonal to the seatback 12 in an upright position and has a four-bar linkage 20. The four-bar linkage 20 includes a top link 22 for supporting a cushion 24, a bottom link 26 extending below the top link 22, a rear link 28 pivotally coupling a rearward portion of the top link 22 with a rearward portion of the bottom link 26, and a front link 30 pivotally coupling a forward portion of the top link 22 with a forward portion of the bottom link 26. A connecting member 32 pivotally couples the bottom link 26 with the seatback 12. A base member 34 pivotally couples an intermediate portion of the front link 30 with a fixed front bracket 36. A linkage assembly 37 includes the four-bar linkage 20, the connecting member 32, and the base member 34.

As illustrated in FIG. 1, the vehicle seating assembly 10 is shown in a driver's side, rear seat location of a vehicle 38. It is understood that the vehicle seating assembly 10 may be positioned at various locations throughout the vehicle 38 other than the illustrated position, such as, a passenger side location and a mid-row seat location. It is also conceivable that the seating assembly 10 may be altered in lateral width, among other dimensions, to accommodate a smaller or larger portion of a seat row, such as sixty percent of a row, or an entire row within the vehicle. Further, the seating assembly 10 may be similarly positioned in various other vehicle types, including vans, trucks, cars, station wagons, and sport utility vehicles.

Figure 2:
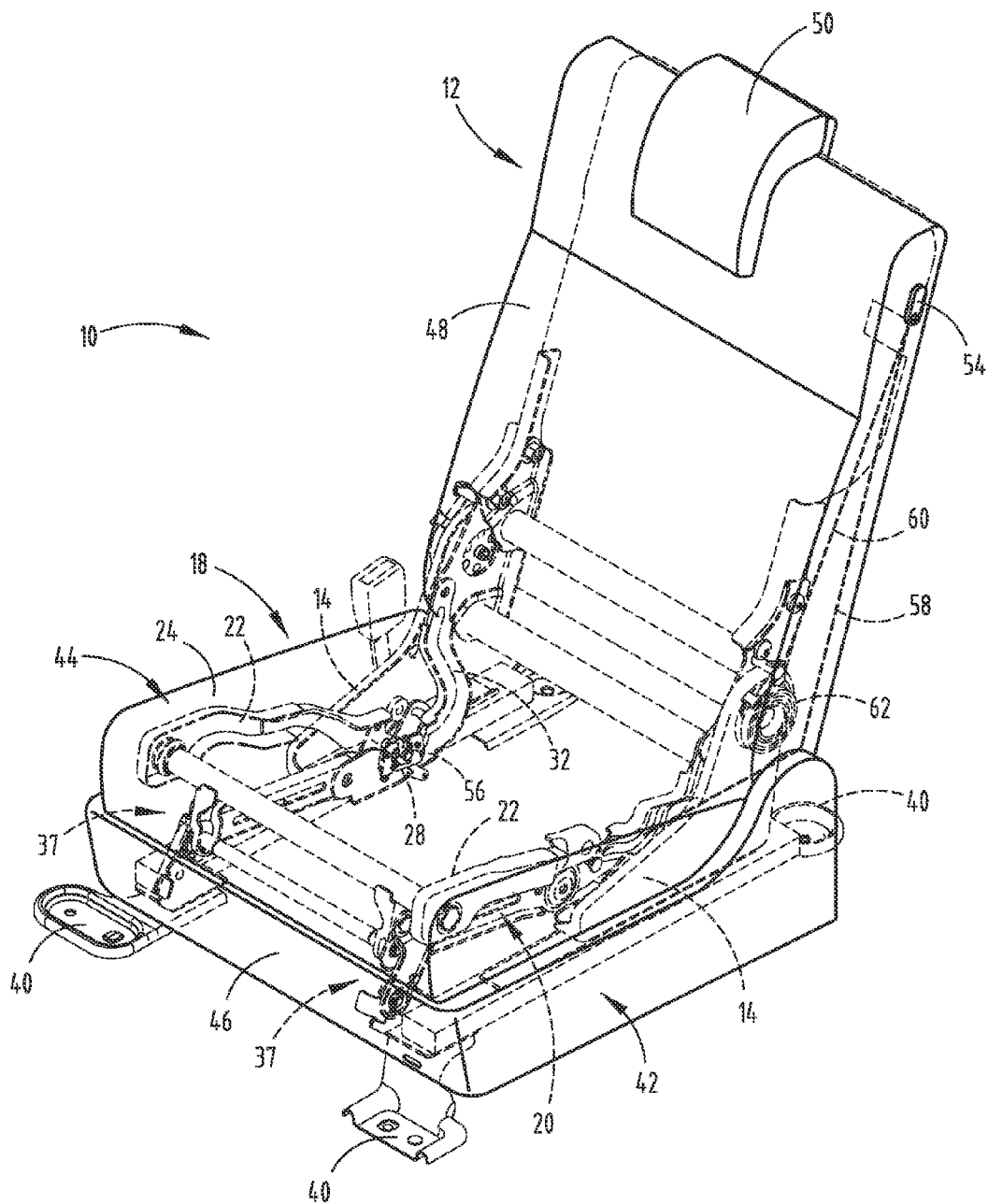
FIG. 2 is a front top perspective view of the vehicle seating assembly, having a linkage assembly and a support structure shown in dashed lines.
Figure 3:
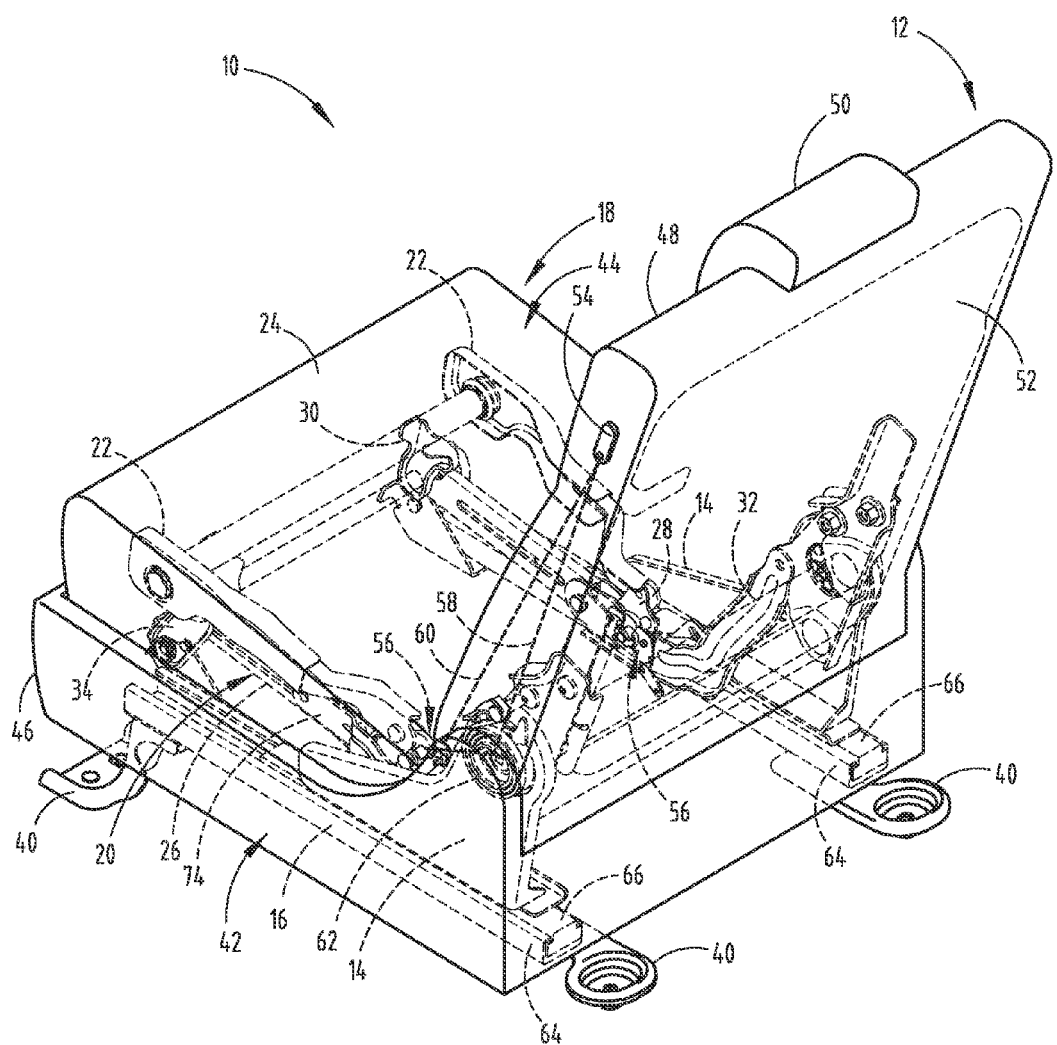
FIG. 3 is a rear top perspective view of the vehicle seating assembly, having a linkage assembly and a support structure shown in dashed lines.

Referring now to FIGS. 2-3, the seat 18 of the vehicle seating assembly 10 includes a base mount 40 configured to couple with a floor of the vehicle 38 at each corner of the seat 18, including two base mounts 40 on a lateral first side 42 of the seat 18 and two base mounts 40 on a lateral second side 44 of the seat 18. The base mounts 40 are configured to support the seating assembly 10 in a substantially level horizontal configuration, as shown. As such, the front left base mount 40 extends vertically down from the first side 42 of the seat 18 to couple with the vehicle floor and the front right base mount 40 extends vertically down from the second side 44 at a distance less than the left base mount 40 to couple with the vehicle floor. It is conceivable that the base mounts 40 may alternatively extend from the seat 18 to support and maintain the seating assembly 10 in a substantially level configuration relative to the vehicle interior. The base mounts 40, as illustrated, are fixedly coupled to vehicle floor with screw fasteners. Alternatively the base mounts 40 may be coupled to the vehicle floor with other fasteners known in the art and/or the base mounts 40 may be an integral piece with the seat 18 and/or the vehicle floor.

As shown in FIGS. 2-3, the seat 18 also includes the cushion 24 configured to support the legs and pelvis of a passenger in a seated position. The cushion 24 extends over the upper portion of the seat 18 between the first and second sides 42, 44 of the seat 18. A front portion of the cushion 24 has a greater thickness than a rear portion of the cushion 24. It is conceived that the cushion 24 may take on a variety of shapes and constructions to support the weight of a passenger. Also, the cushion 24 may include a cover stock material, such as leather, cloth, or other material known in the art, disposed over a sitting surface of the cushion 24. The cushion 24 is at least partially supported by the top link 22 of the four-bar linkage 20. Conceivably, a seat pan or other seat suspension carrier is coupled between the top link 22 and the cushion 24 to provide support to the cushion 24 between the top links 22 on the first and second sides 42, 44 of the seat 18. As illustrated in FIG. 2, a base trim shroud 46 is included on the seat 18 between the base mounts 40 and the cushion 24 to substantially conceal the linkage assembly 37 and support structure of the seating assembly 10 from plain view.

Still referring to FIGS. 2-3, the rear bracket 14 pivotally supports the seatback 12 proximate the rear portion of the cushion 24. The seatback 12 includes a back cushion portion 48 that has a substantially rectangular prism shape and is configured to support a passenger's back in a seated position. It is conceivable that the back cushion portion 48 may also include other shapes and configurations, such as a curvature corresponding to a passenger's spine. The seatback 12 also includes a head restraint 50 integrated with an upper area of the back cushion portion 48 that is configured to support a passenger's head. The head restraint 50 may conceivably be a separate piece from the seatback 12 that is capable of having an adjustable position mechanism to correspond to the relative position of a passenger's head. Also, the seatback 12 includes a cover stock material different from or similar to the seat 18, such as leather, cloth, or other material known in the art, which is disposed over the back cushion portion 48, the head restraint 50, and other conceivable portions of the seatback 12. As also shown in FIG. 3, the seatback 12 includes a cargo panel 52 disposed over a rear portion of the seatback 12 that is configured to support objects when the seating assembly 10 moves to a stowed position, as described in more detail below.

A manual actuator 54, as shown in FIGS. 2-3, is located on a side portion of the seatback 12. The manual actuator 54 is operably coupled with a latch assembly 56 in the seat 18 that detachably couples the rear link 28 of the four-bar linkage 20 with the connecting member 32. The manual actuator 54 is configured to move the latch assembly 56 between a closed position and an open position. As illustrated, the manual actuator 54 includes a lever pivotally coupled with the seatback 12 and spring-biased about the pivotal connection. Accordingly, pivotal movement of the lever against the spring-bias pulls a first cable 58 and a second cable 60 to simultaneously actuate the latch assembly 56 and a recliner mechanism 62.

As shown in FIG. 2, the first cable 58 extends between the lever and the latch assembly 56 to move the latch assembly 56 between the closed and open positions. The second cable 60 of the manual actuator 54 extends between the lever and the recliner mechanism 62 pivotally connecting the seatback 12 with the rear bracket 14. The recliner mechanism 62 includes a clock spring, among other components, that is configured to urge the seatback 12 to pivot forward relative to the rear bracket 14. Upon actuation of the lever, the second cable 60 is configured to disengage the recliner mechanism 62 to allow the seatback 12 to pivot about the rear bracket 14. As such, pivotal rotation of the lever simultaneously actuates the latch assembly 56 and the recliner mechanism 62 to manipulate the position of the seating assembly 10, as explained in more detail below. The path and configuration of the first and second cables 58, 60 shown between the lever and the latch assembly 56 and recliner mechanism 62 is one exemplary embodiment, such that the cables 58, 60 may also conceivably include Bowden cables or other lines known in the art. Further, it is conceived that separate levers, a single cable, or alternative devices may be used for the manual actuator 54, such as a pull cord, a linkage arrangement, an electric push button, as well as other conceivable manual actuators.

As illustrated in FIG. 3, the rear bracket 14 is slidably engaged with the track assembly 16. The track assembly 16 includes a lower rail 64 on the first side 42 and the second side 44 of the seat 18 that longitudinally extends from a front portion of the seat 18 to the rear portion of the seat 18, in general alignment with the vehicle floor. The opposing ends of the lower rail 64 are coupled with the base mounts 40 to secure the lower rail 64 relative to the vehicle floor. The lower rail 64 includes an upward facing channel with inward extending fingers on opposing sides of the channel. A T-shaped upper rail 66 slidably engages the channel and is vertically retained therein by the fingers. The rear bracket 14 is coupled with the upper rail 66 thereby permitting longitudinal fore and aft movement of the rear bracket 14 by the upper rail 66 sliding within the channel of the lower rail 64. It is conceivable that the construction of the lower rail 64 and the upper rail 66 may be reversed or alternatively configured to achieve a similar sliding actuation. Further, the track assembly 16 may include other sliding mechanisms or devices to alter the longitudinal position of the rear bracket 14.

Figure 4:
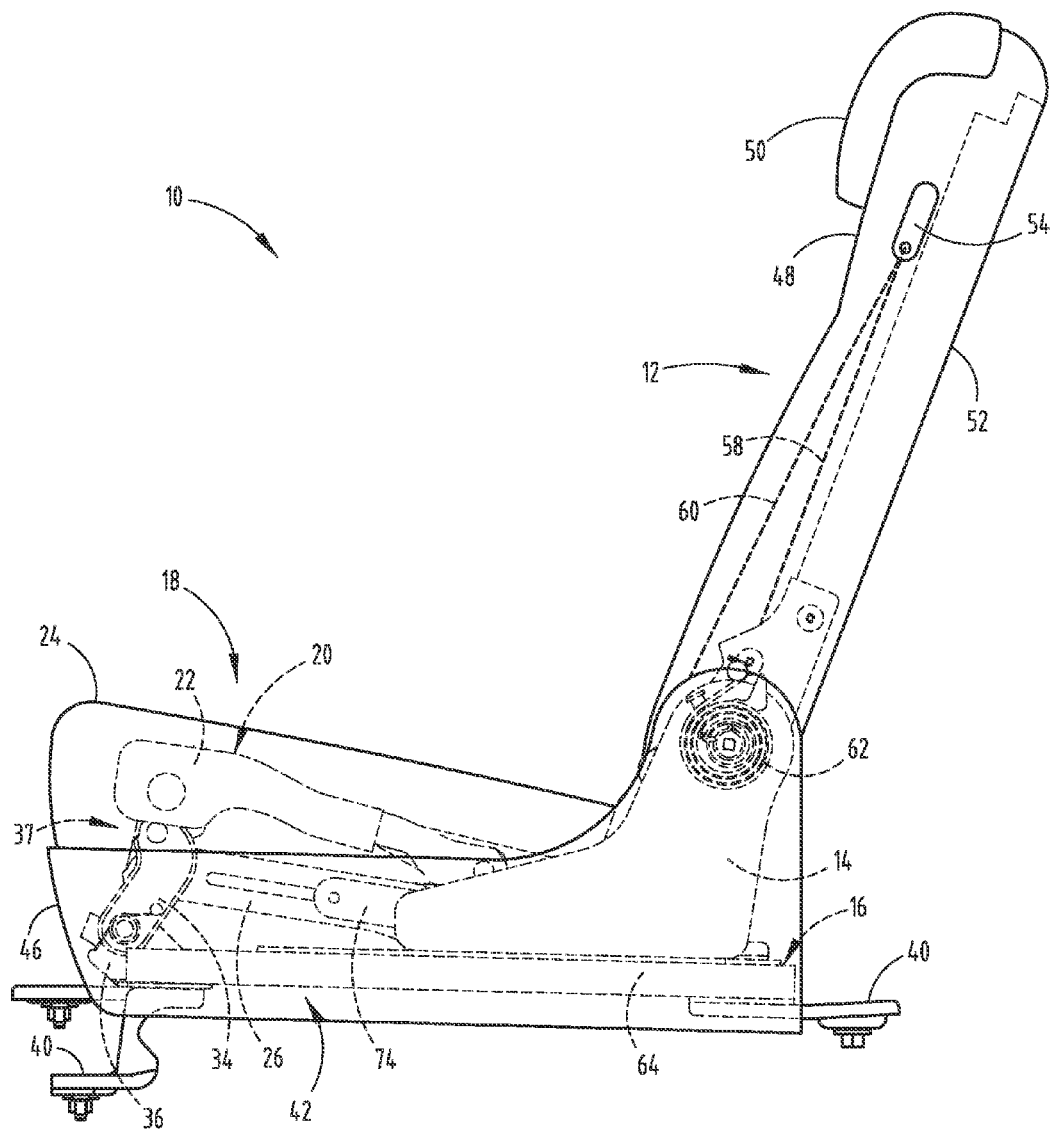
FIG. 4 is a side elevational view of the vehicle seating assembly.

The seat 18, as shown in FIG. 4, is positioned generally orthogonal to the seatback 12, in an upright position, aligning the linkage assembly 37 of the seat 18 as illustrated. The linkage assembly 37 is pivotally coupled with the fixed front bracket 36. More specifically, the base member 34 of the linkage assembly 37 is pivotally coupled with the front bracket 36. The front bracket 36 includes a lower portion fixedly coupled between the lower rail 64 of the track assembly 16 and the base mount 40 proximate the front portion of the seat 18. An upper portion of the front bracket 36 extends vertically from the lower portion, such that the upper portion is substantially orthogonal relative to the lower portion of the front bracket 36. The upper portion of the front bracket 36 is pivotally coupled with the base member 34 of the linkage assembly 37.

Figure 5:
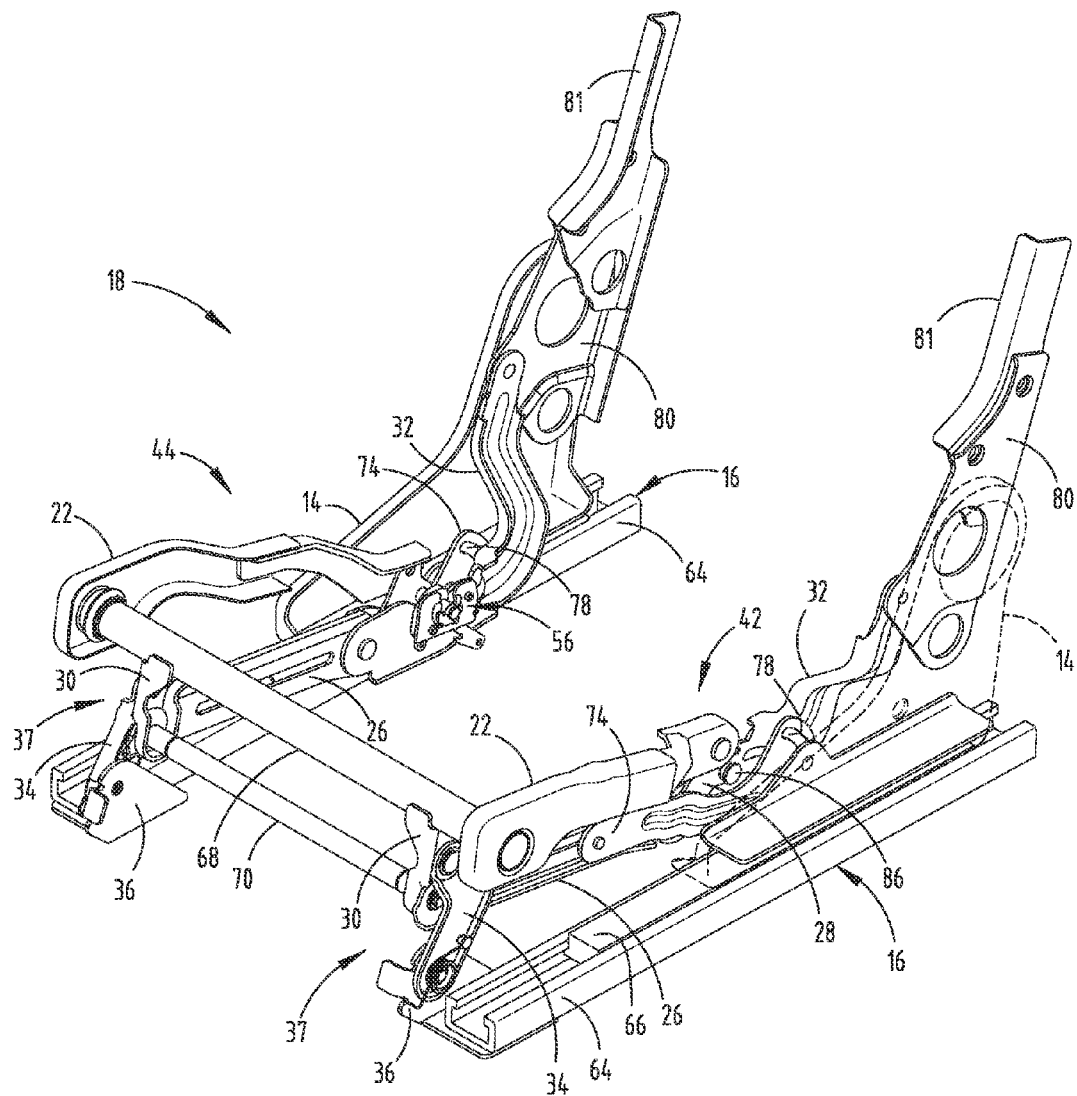
FIG. 5 is a top perspective view of the linkage assembly and support structure.

Referring now to FIG. 5, the front portion of the seat 18 includes an upper rod 68 having a cylindrical shape and extending between the top links 22 on the first and second sides 42, 44. It is conceived that the upper rod 68 may support the cushion 24 along with the top links 22 and other components that support a seated passenger. The front link 30 of the four-bar linkage 20 is coupled with and extends down from an inboard portion the upper rod 68. A lower rod 70 also spans across the front portion of the seat 18, extending between bottom ends of the front links 30 of the four-bar linkage 20. The lower rod 70 also has a cylindrical shape, but with a diameter smaller than the upper rod 68. The four-bar linkage 20 and other components of the linkage assembly 37 generally include a mirror image component on opposing sides of the seating assembly 10, such that the following description will refer to and describe a single side of the seating assembly 10. It also understood that the seating assembly 10 may not have mirror image components and may be configured with components from a single side of the linkage assembly 37.

Figure 6:
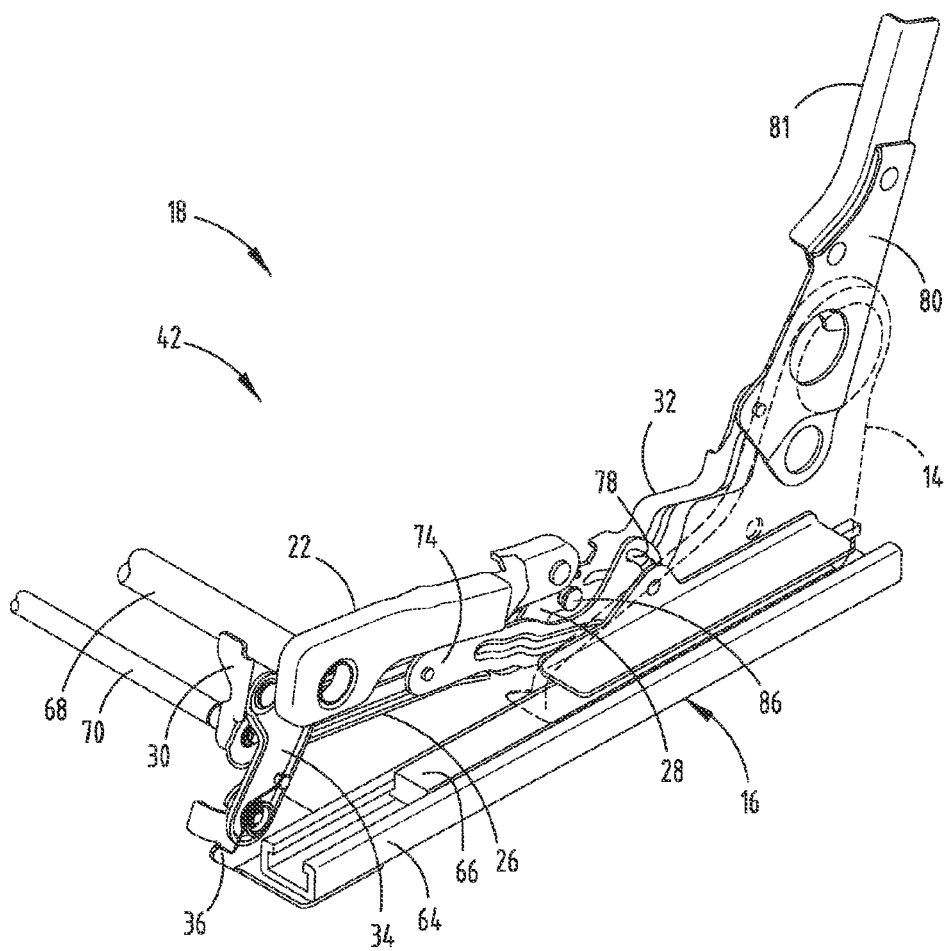
FIG. 6 is a top perspective view of a first side of the linkage assembly and support structure.

As illustrated in FIG. 6, the base member 34 is pivotally coupled with and extends from the front bracket 36, and also pivotally coupled with an intermediate portion of the front link 30 of the four-bar linkage 20. Further, the base member 34 is spring-biased to rotate forward about the fixed front bracket 36. The lower end of the front link 30 is pivotally coupled with the bottom link 26 of the four-bar linkage 20 proximate the lower rod 70. As such, the base member 34 pivotally couples with the front link 30 between the upper end of the front link 30, which is pivotally coupled with a forward portion of the top link 22, and the lower end of the front link 30, which is pivotally coupled with a forward portion of the bottom link 26 of the four-bar linkage 20. Accordingly, the base member 34 pivotally supports a front portion of the four-bar linkage 20.

Figure 6A:
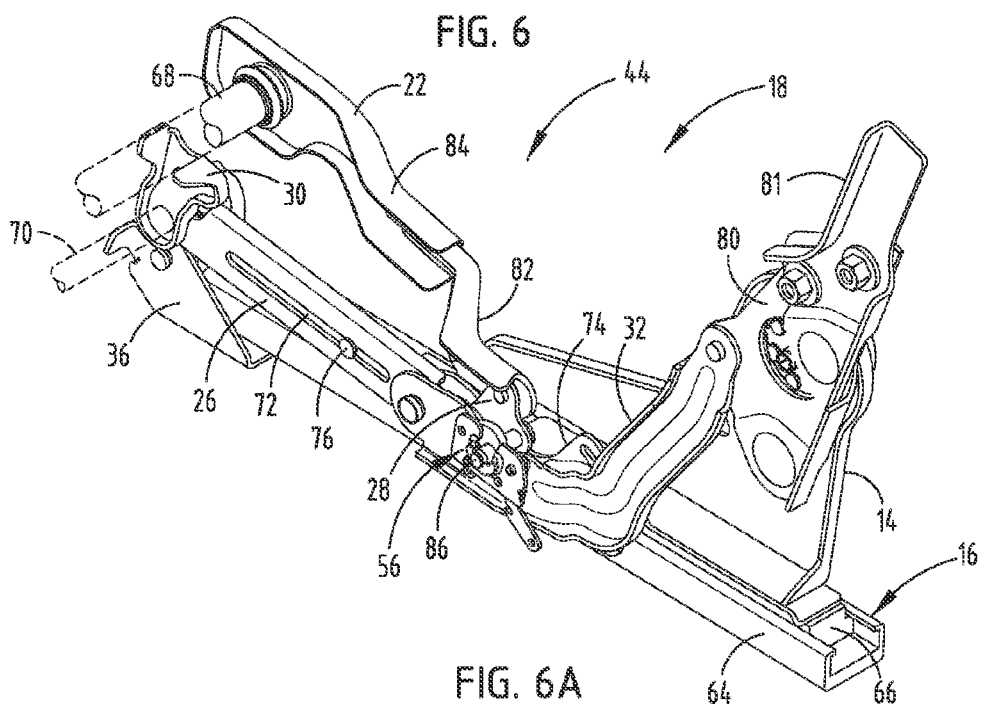
FIG. 6A is a top perspective view of a second side of the linkage assembly and support structure.

As illustrated in the embodiments of FIGS. 6-6A, the connecting member 32 has an L-shape and extends between the bottom link 26 and the seatback 12. More specifically, with the seat 18 in the upright position, the connecting member 32 extends rearward from the four-bar linkage 20 and upward to pivotally couple with a base plate 80 of the seatback 12. An upper portion of the base plate 80 supports and couples with a frame member 81 of the seatback 12. In addition, a central portion of the base plate 80 pivotally couples with the rear bracket 14 to allow for pivotal reclining of the seatback 12. The rear bracket 14 extends vertically down from the pivotal connection with the base plate 80 of the seatback 12 to couple with the upper rail 66 of the track assembly 16. The lower portion of the rear bracket 14 that couples with the track assembly 16 extends orthogonally from the rear bracket 14 to form a substantially horizontal surface in alignment with the upper rail 66. It is conceivable that the rear bracket 14 may be alternatively arranged and coupled with the track assembly 16 and the seatback 12.

Figure 7:
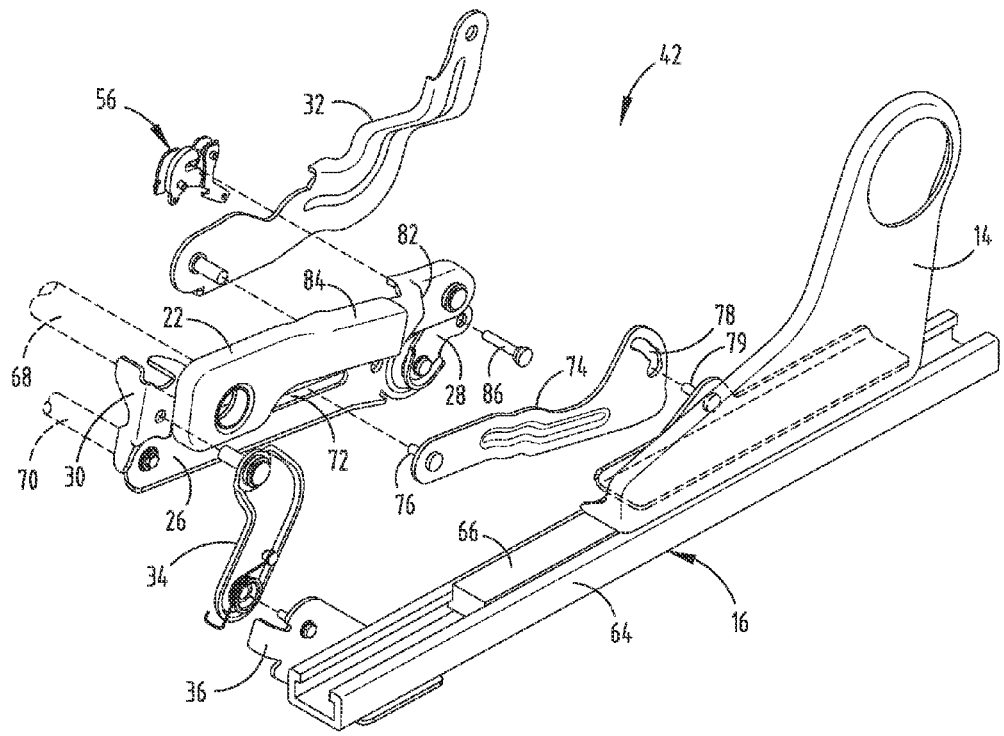
FIG. 7 is an exploded top perspective view of the first side of the linkage assembly, showing a latch assembly.
Figure 7A:
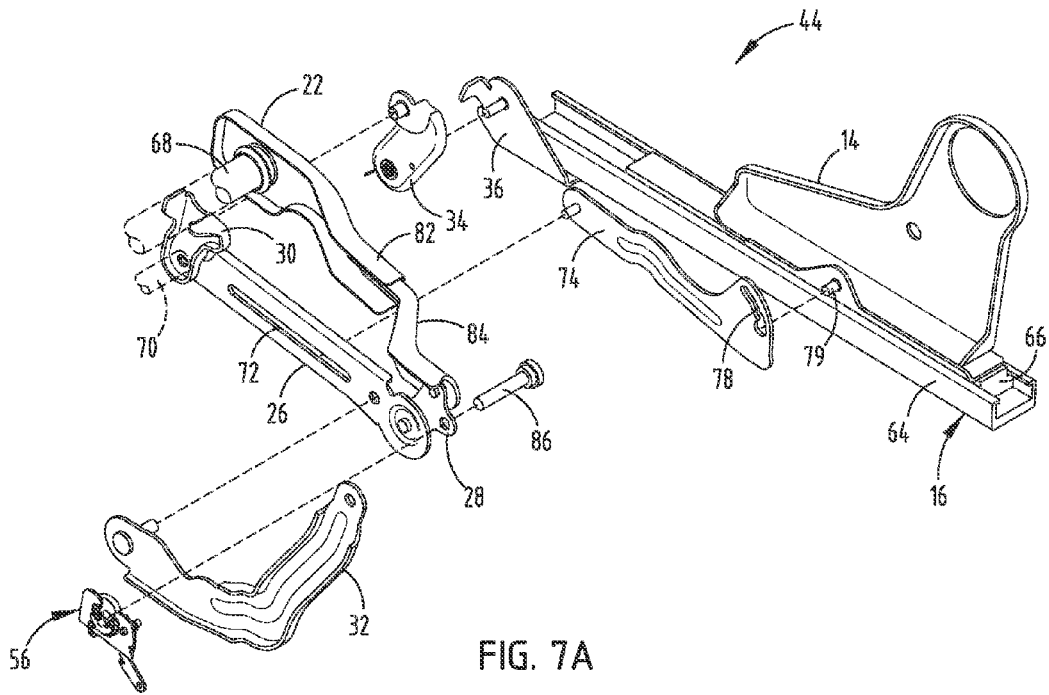
FIG. 7A is an exploded top perspective view of the second side of the linkage assembly, showing a latch assembly.

As shown in the illustrated embodiments of FIGS. 7-7A, the bottom link 26 extends longitudinally below and in general alignment with the top link 22. The bottom link 26 includes a slot 72 with a generally linear shape extending along the length of the bottom link 26. The slot 72 in the bottom link is slidably engaged by a first end of a support member 74. More specifically, the first end of the support member 74 includes a protrusion 76 that slidably engages the slot 72. The second end of the support member 74 couples with the rear bracket 14. The second end of the support member 74 includes an arcuate groove 78 that extends upward substantially orthogonal from a longitudinal extent of the support member 74. A peg 79 on the rear bracket 14 engages the arcuate groove 78 on the second end of the support member 74. Beyond the slot 72, at the rearward end of the bottom link 26, the bottom link 26 pivotally couples with the rear link 28. The rear link 28 extends between and pivotally couples the rearward portion of the bottom link 26 with a rearward portion of the top link 22, completing the four-bar linkage 20.

Figure 8:
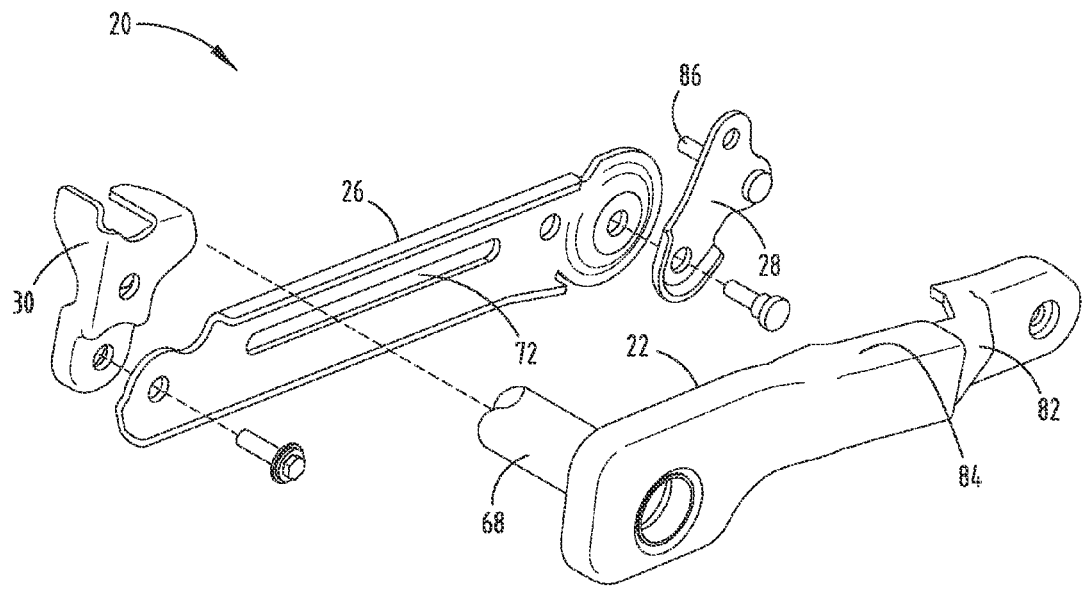
FIG. 8 is an exploded top perspective view of a four-bar linkage of the linkage assembly.
Figure 8A:
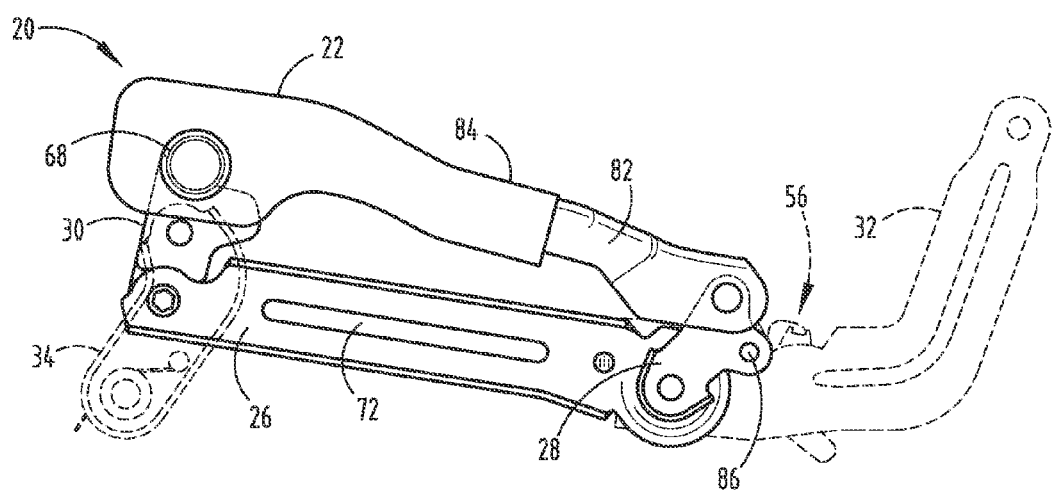
FIG. 8A is a side elevational view of the four-bar linkage of the linkage assembly, showing the connecting member and the base member in dashed lines.
Figure 8B:
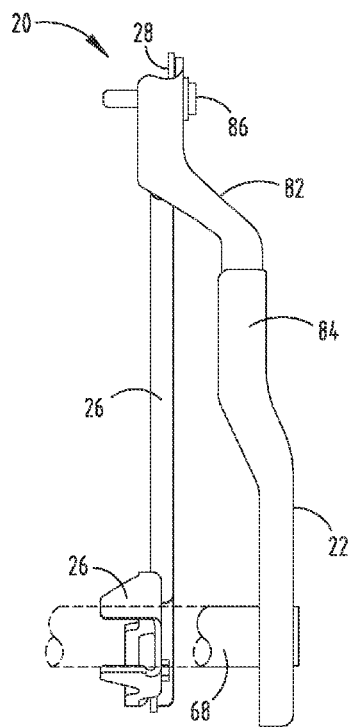
FIG. 8B is a top plan view of the four-bar linkage of the linkage assembly.
Figure 8C:
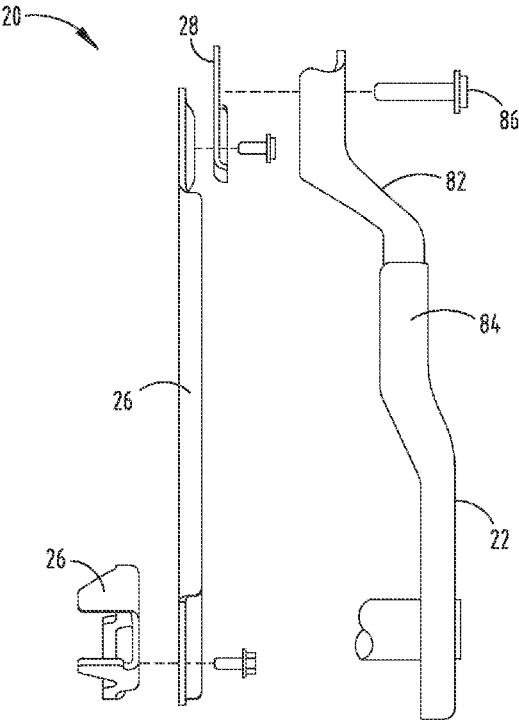
FIG. 8C is an exploded top plan view of the four-bar linkage of the linkage assembly.

Referring now to FIGS. 8-8C, the four-bar linkage 20 includes the top link 22, the bottom link 26, the rear link 28, and the front link 30. The top link 22 includes an inward bend 82 proximate the mid-portion thereof between the forward portion and the rearward portion, such that the top link 22 transitions inboard at the inward bend 82. Accordingly, the forward and reward portions of the top link 22 are substantially linear and parallel, having the forward portion laterally outboard from the rearward portion. A flange portion 84 extends laterally from the top link 22, surrounding a periphery thereof and protruding inboard. The forward portion of the top link 22 includes an aperture for pivotally coupling with the upper rod 68. The upper end of the front link 30 couples with the upper rod 68 inboard the pivotal connection of the upper rod 68 with the top link 22. The front link 30 is generally linear and includes an inboard extending flange portion around the periphery thereof. An outboard facing surface of the front link 30, proximate the lower end of the front link 30, engages an inboard facing surface of the bottom link 26 and pivotally couples with an aperture in the bottom link 26. The bottom link 26 is substantially linear and the linear slot 72 therein extends along a central portion thereof in alignment with a longitudinal extent of the bottom link 26. The bottom link 26 also includes an aperture for pivotally coupling the connecting member 32 between the slot 72 and the rearward portion of the bottom link 26. The lower end of the rear link 28 pivotally couples with an outboard facing surface of the bottom link 26, proximate the rearward portion of the bottom link 26. The upper end of the rear link 28 pivotally couples with an inboard facing surface of the rearward portion of the top link 22. The rear link 28 includes a striker post 86 extending laterally inboard from an intermediate portion thereof for connection with the latch assembly 56. It is conceivable that the four-bar linkage 20 may be alternatively shaped and configured for the same or similar movement, as described below.

Figure 9:
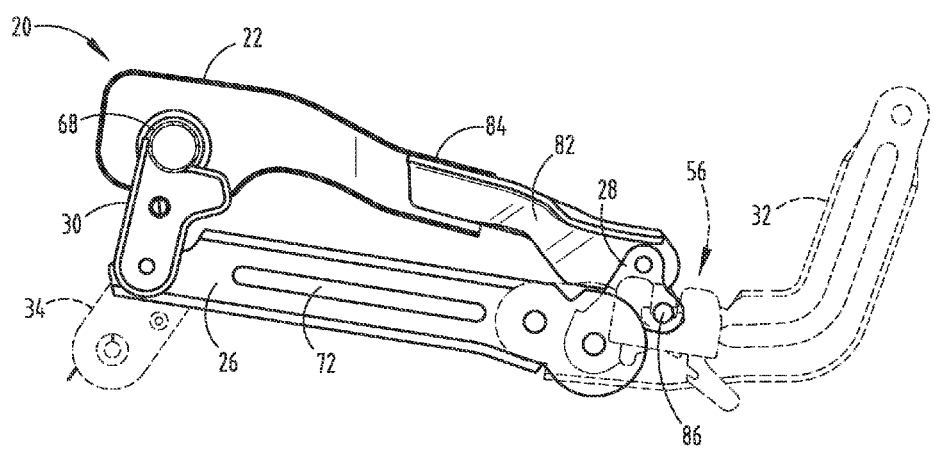
FIG. 9 is a side elevational view of the four-bar linkage of the linkage assembly, showing the latch assembly in dashed lines.

As shown the embodiment illustrated in FIGS. 9-9C, the latch assembly 56 detachably couples the connecting member 32 with the rear link 28 of the four-bar linkage 20. The latch assembly 56 includes a housing plate 88 coupled with a forward portion of the connecting member 32. The housing plate 88 has a mouth 90 for receiving the striker post 86 on the rear link 28. A latch arm 92 is pivotally coupled between the housing plate 88 and the connecting member 32. The latch arm 92 is spring-biased to an open position, as shown in FIG. 9C, aligning the mouth 90 on the housing plate 88 with a catch opening 94 on the latch arm 92. A pawl lever 96 is also pivotally coupled between the housing plate 88 and the connecting member 32. The pawl lever 96 engages a notch on the latch arm 92 when the latch arm 92 is pivoted from the open position to the closed position, as shown in FIGS. 9 and 9B, thereby holding the latch arm 92 in the closed position. In the closed position, the latch arm is positioned so the catch opening 94 is substantially perpendicular to the mouth 90 on the housing plate 88 to retain the striker post 86 in the catch opening and at the base of the mouth 90. Thus, in the closed position the connecting member 32 is coupled with the rear link 28. Upon movement of the manual actuator 54 (FIG. 2), the pawl lever 96 is rotated to disengage the latch arm 92 and allow the latch arm 92 to rotate to the open position. In the open position, the connecting member 32 may detach the rear link 28, thereby allowing movement of the seating assembly 10 to a rear access position, as described below. It is conceivable that the latch assembly 56 may be alternatively configured to lock the seating assembly 10 in the upright position and prevent movement to the rear access position.

Figure 10:
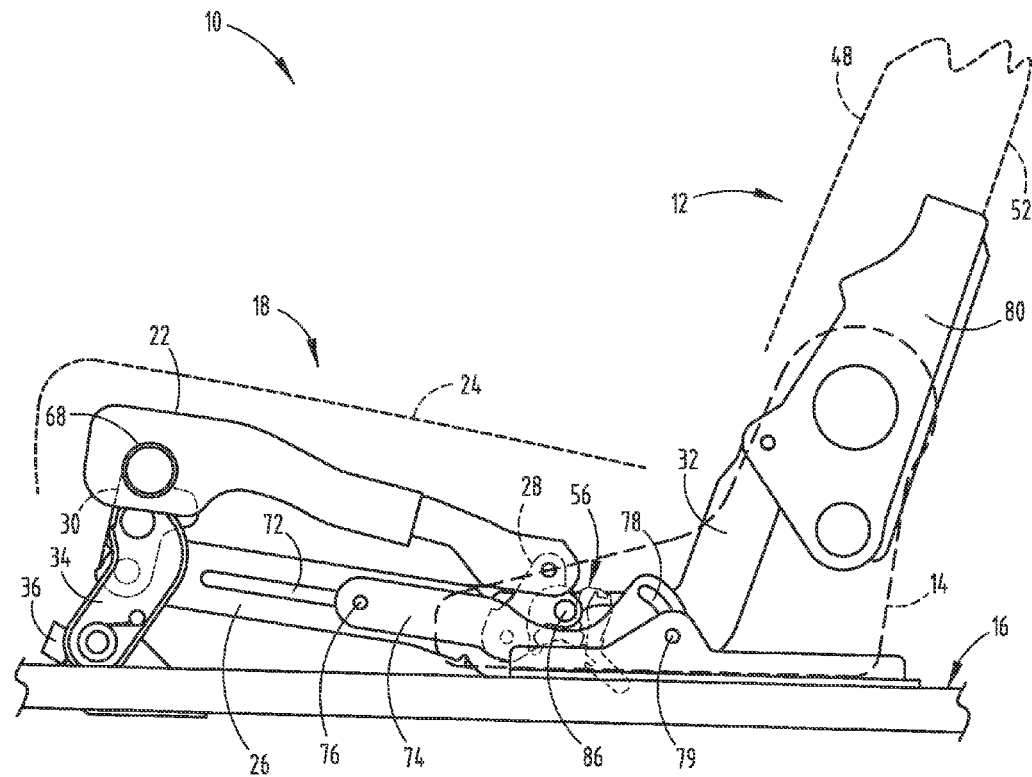
FIG. 10 is a side elevational view of the seating assembly in a upright position.

As shown in FIG. 10, the seating assembly 10 is in the upright position. In this position, the base member 34 is substantially aligned with the front link 30 and the seatback 12, but generally orthogonal relative to the track assembly 16. Similarly, the forward portion of the L-shaped connecting member 32 is substantially aligned with the bottom link 26 of the four-bar linkage 20. Accordingly, the front and rear links 30, 28 of the four-bar linkage 20 are substantially orthogonal relative to the top and bottom links 22, 26 thereof. In addition, the latch assembly 56 is in the closed position retains the striker post 86 of the rear link 28 in the mouth 90 of the housing plate 88, as shown in FIG. 9B, thereby coupling the rear link 28 with the connecting member 32. It is conceivable that the seating assembly 10 may be configured to allow the seatback 12 to be reclined about the rear bracket 14 in the upright position to various rearward reclined orientations for the comfort of a seated passenger. Accordingly, it is conceivable that the upright position may assume various alternative orientations from that illustrated in FIG. 10.

Figure 11:
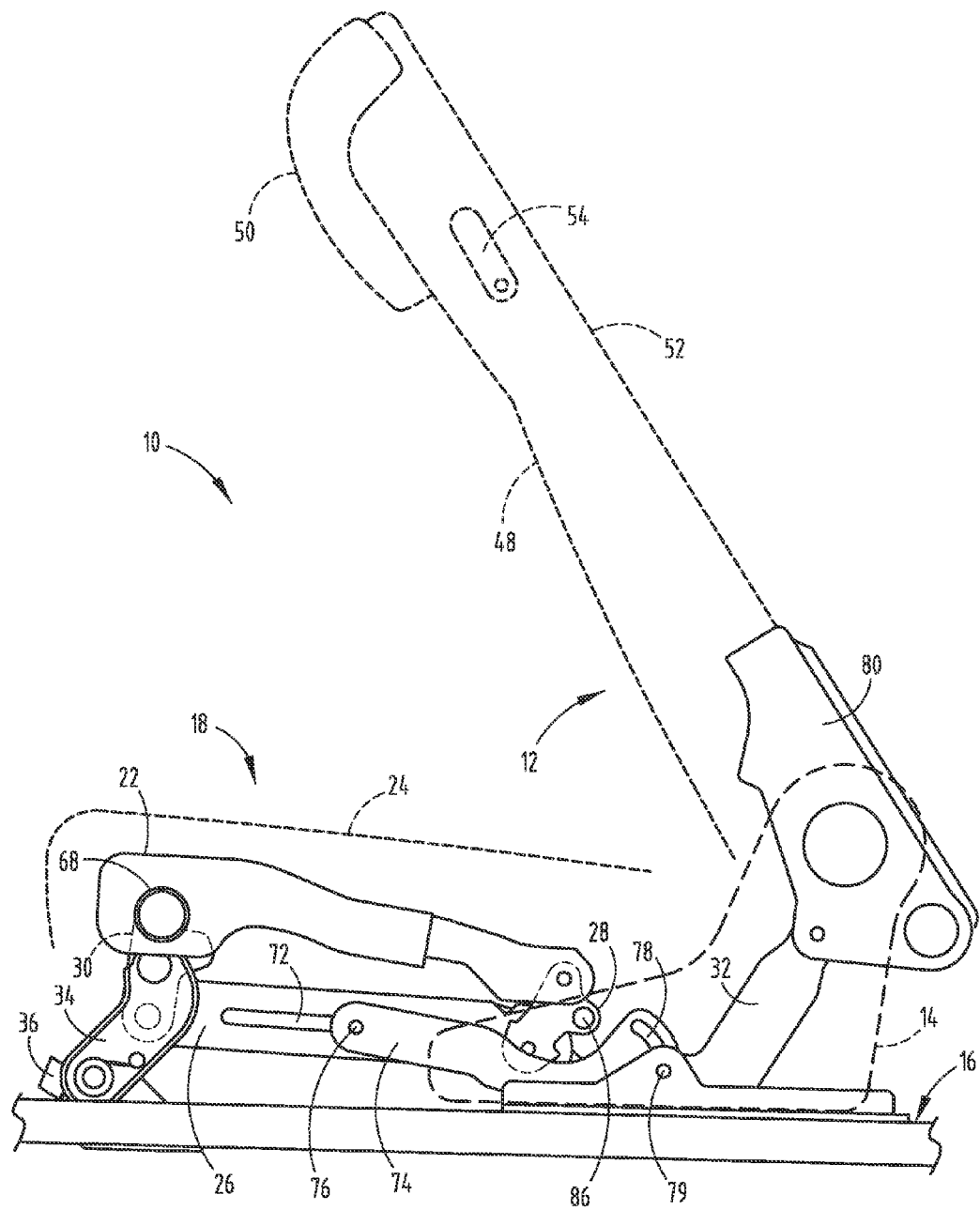
FIG. 11 is a side elevational view of the seating assembly transitioning between the upright position and a stowed position.

In transitioning the seating assembly 10 to the stowed position, as shown in FIG. 11, the seatback 12 is rotated forward about the rear bracket 14. To allow this rotation the manual actuator 54 moves the latch assembly 56 to the open position, disengaging the connecting member 32 from the rear link 28. The forward rotation of the seatback 12 thereby causes the connecting member 32 to be drawn down and rearward. The rearward movement of the connecting member 32 similarly draws the four-bar linkage 20 rearward and rotates the upper end of the base member 34 rearward. As such, the connecting member 32 causes the four-bar linkage 20 to start to collapse, whereby the bottom link 26 moves rearward and in closer proximity relative to the top link 22. The rearward movement of the four-bar linkage 20 causes the protrusion 76 on the first end of the support member 74 to slide forward in the slot 72 in the bottom link 26.

Figure 12:
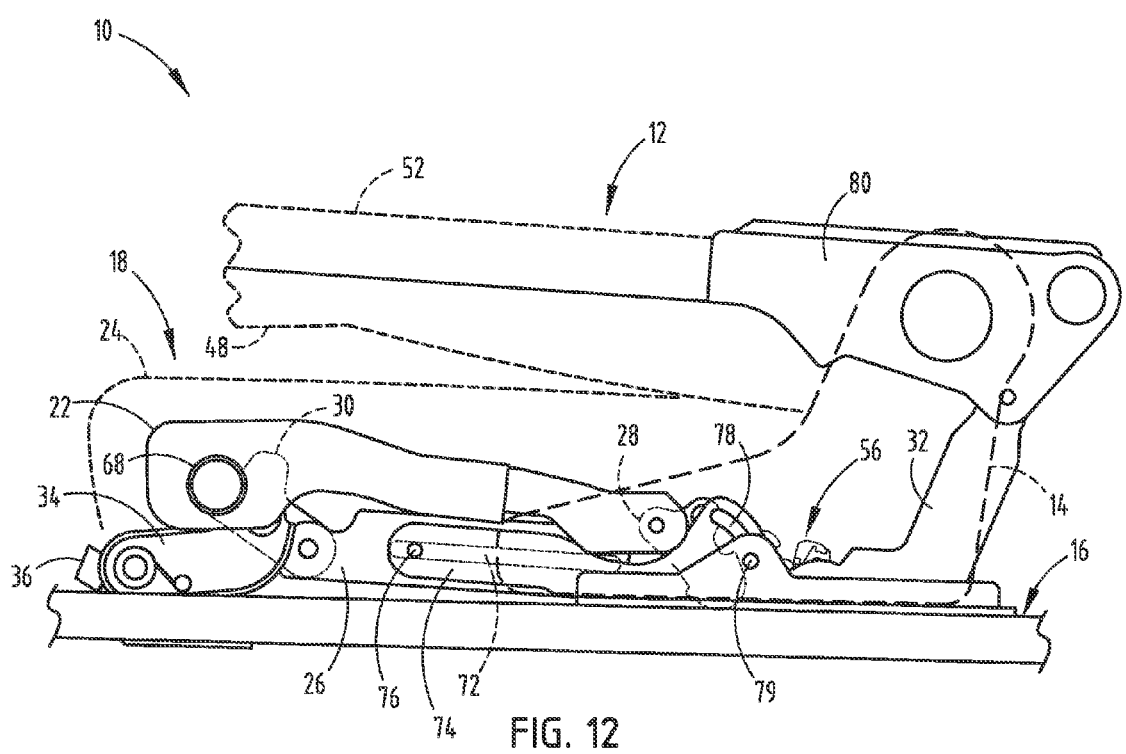
FIG. 12 is a side elevational view of the seating assembly in the stowed position.

As illustrated in FIG. 12, the seating assembly 10 is in the stowed position, having the seatback 12 rotated forward to a substantially horizontal orientation to allow the cargo panel 52 to support objects. In this position, the back cushion portion 48 of the seatback 12 is abutting the cushion 24 on the seat 18. The forward rotation of the seatback 12 causes the pivotal connection of the seatback 12 with the rearward portion of the connecting member 32 to be positioned rearward the rear bracket 14, causing the seat 18 to collapse rearward beneath the seatback 12. During the collapse, the base member 34 rotated rearward approximately ninety degrees from the upright position to be generally parallel with the track assembly 16 and the bottom link 26 of the four-bar linkage 20. By collapsing the four-bar linkage 20, the bottom link 26 is positioned in close proximity to the top link 22. Accordingly, the protrusion 76 on the first end of the support member 74 is slid further forward in the slot 72 in the bottom link 26. From the stowed position, the seatback 12 may be raised and rotated rearward to transition the seating assembly 10 back to the upright position, recapturing the orientation as shown in FIG. 8 and described above. It is conceivable that the stowed position may assume various alternative orientations from that illustrated in FIG. 12 to maintain a substantially collapsed orientation of the seating assembly 10 to expand the cargo area of a vehicle.

Figure 13:
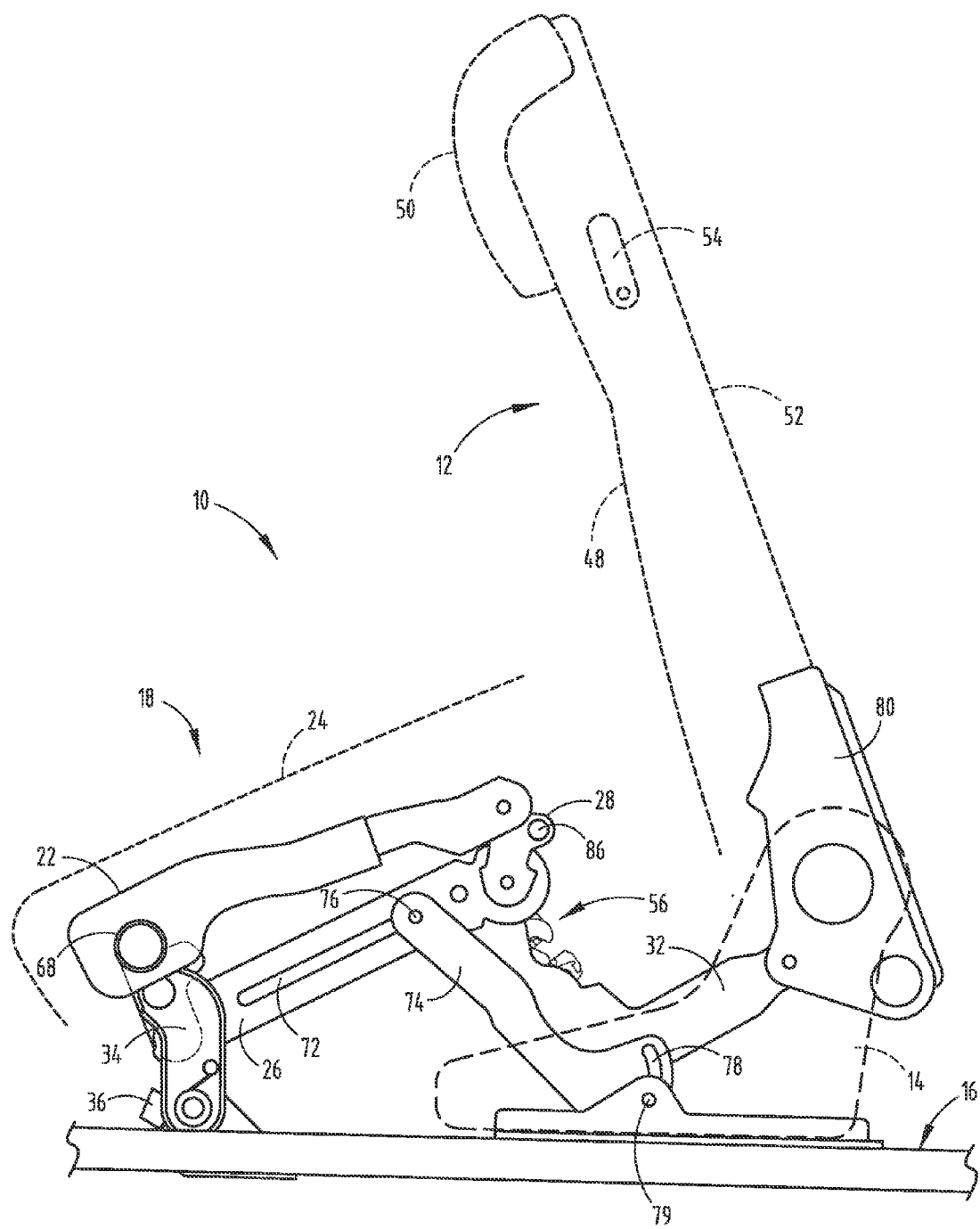
FIGS. 13 and 14 are side elevational views of the seating assembly transitioning between the upright position and a rear access position.
Figure 14:
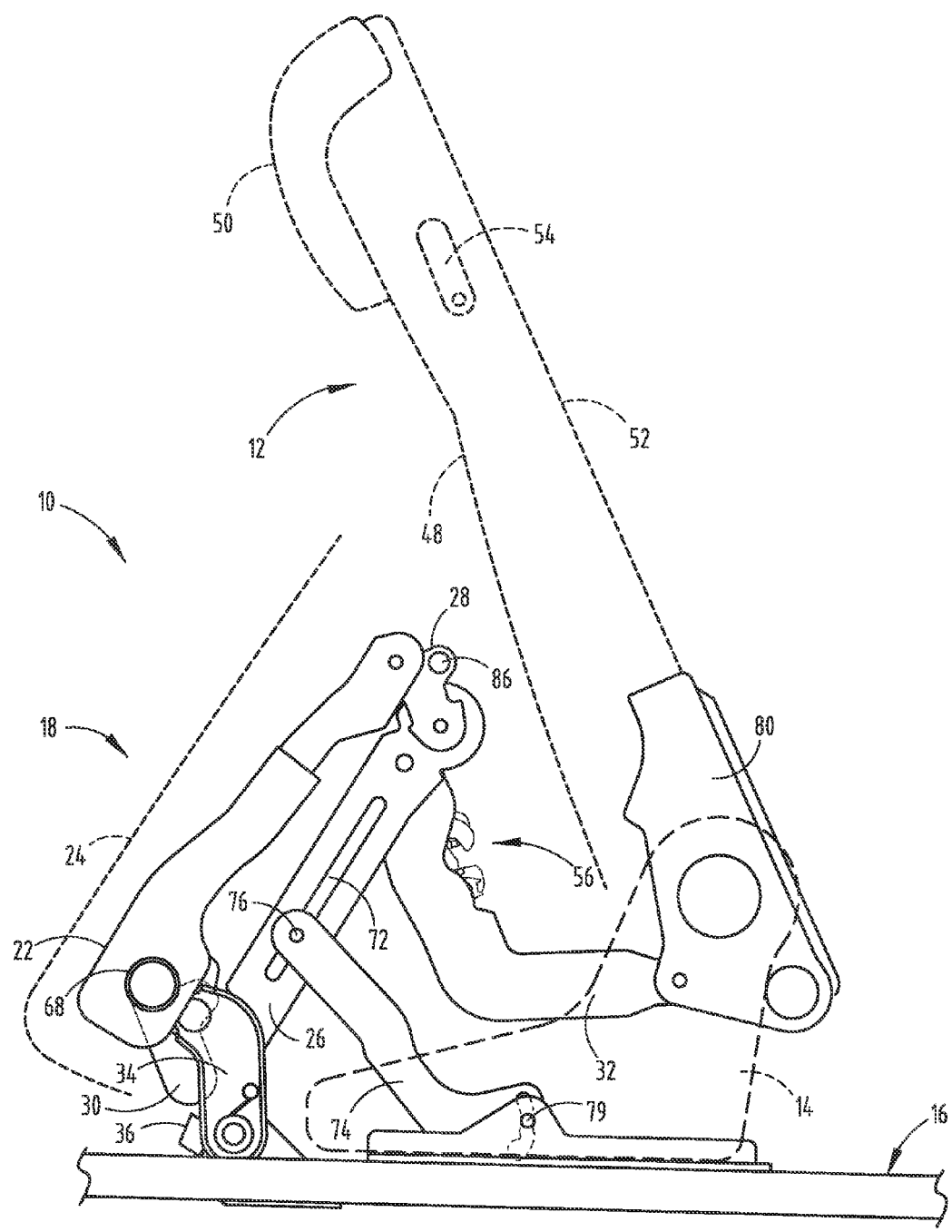

From the upright position, the seating assembly 10 may also transition, as shown in FIGS. 13-14, to the rear access position. Similar to the transition to the stowed position, the seatback 12 is rotated forward slightly about the rear bracket 14. To allow this rotation the manual actuator 54 is actuated to move the latch assembly 56 to the open position, disengaging the connecting member 32 from the rear link 28. To move to the rear access position, however, the seatback 12 is also slid forward. More specifically, the rear bracket 14 slides forward along the track assembly 16 to position the seatback 12 forward. This forward movement causes the connecting member 32 to pivot the seat 18 upward about the base member 34, tilting the cushion 24 on the seat 18 forward by raising the rear portion of the seat 18. Raising the rear portion of the seat 18 causes the first end of the support member 74 to raise and slide to the rear end of the slot 72 and the second end of the support member 74 to slide down and forward in the arcuate groove 78 about the peg 79 on the rear bracket 14. The base member 34 is configured not to rotate forward beyond the substantially vertical orientation assumed in the upright position, such that the seat 18 pivots forward about the upper end of the base member 34.

Figure 15:
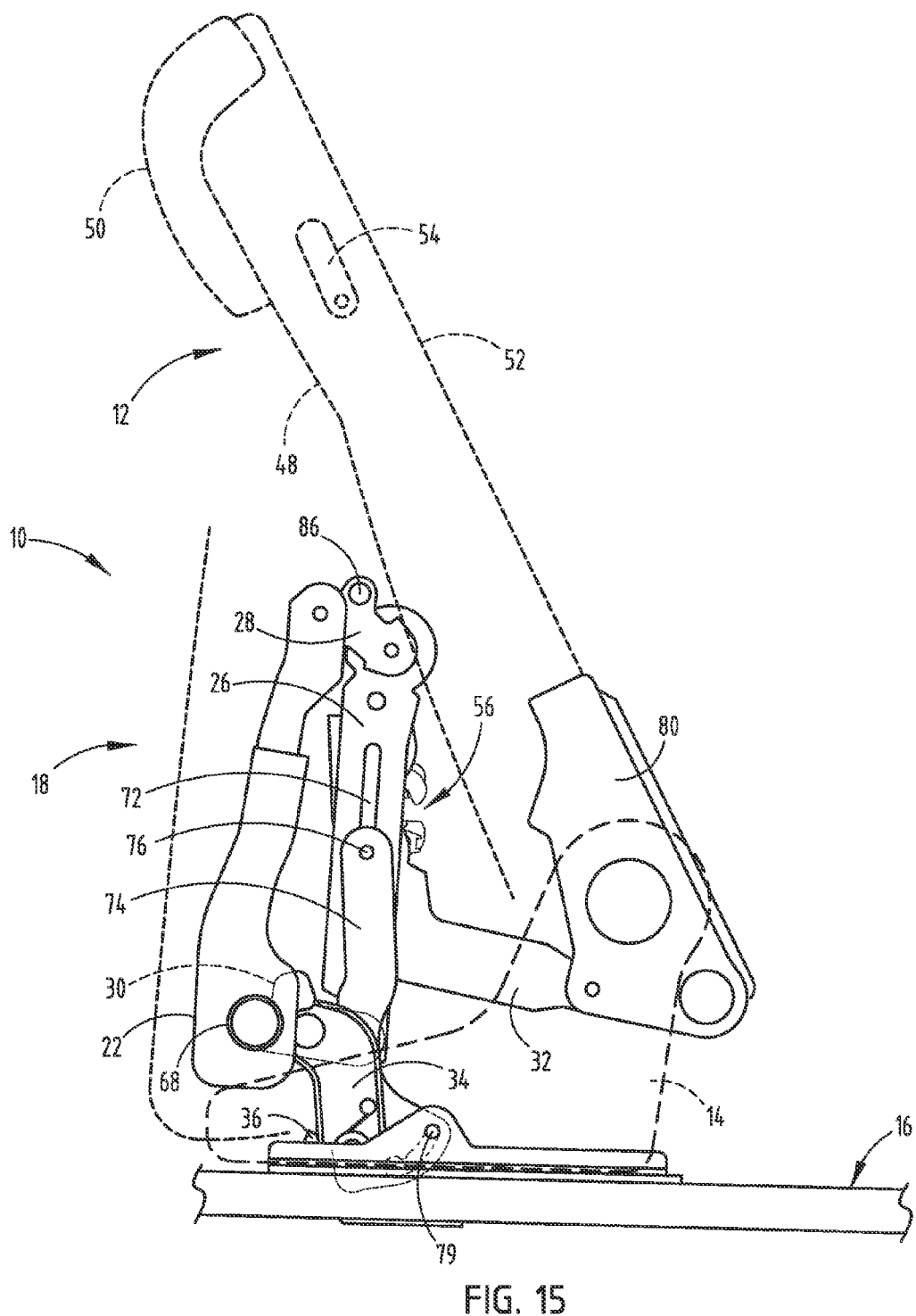
FIG. 15 is a side elevational view of the seating assembly in the rear access position.

As illustrated in FIG. 15, the seating assembly 10 is in the rear access position, having the seatback 12 slid forward on the track assembly 16 to enlarge the area rearward the seatback 12 for ingress, egress, and generally improved access rearward the seatback 12. In this position, the cushion 24 of the seat 18 is facing forward and is in a substantially vertical orientation. The forward portion of the L-shaped connecting member 32 is similarly in a substantially vertical orientation, which causes the seat 18 to assume such an upright position. The upright position of the seat 18 causes the second end of the support member 74 to slide forward about the arcuate groove 78 therein, such that the peg 79 on the rear bracket 14 slides upward in the groove 78. As such, the support member 74 assumes a substantially vertical orientation and provides added support to the seat 18 and the four-bar linkage 20 in the raised rear access position. It is conceivable that additional support members 74 may be similarly included to increase support of the seat 18. It is also conceivable that the rear access position may assume various alternative orientations from that illustrated in FIG. 15 to maintain a substantially forward position of the seating assembly 10.

The seating assembly 10 may be transitioned from the rear access position back to the upright position, as shown in FIG. 10, by reversing the movements and orientations as described above. It is conceivable that the seating assembly 10 may be configured to move to additional positions from those shown and described herein.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seatback;
   a rear bracket pivotally supporting the seatback and slidably engaged with a track assembly;
   a seat positioned substantially orthogonal to the seatback in an upright position and having a four-bar linkage including:
      a top link for supporting a cushion;
      a bottom link extending below the top link;
      a rear link pivotally coupling a rearward portion of the top link with a rearward portion of the bottom link; and
      a front link pivotally coupling a forward portion of the top link with a forward portion of the bottom link;
   a connecting member pivotally coupling the bottom link with the seatback, wherein pivoting the seatback forward about the rear bracket causes the connecting member to collapse the linkage rearward to a stowed position defined by the bottom link in closer proximity to the top link; and
   a base member pivotally coupling an intermediate portion of the front link with a fixed front bracket, wherein sliding the seatback forward causes the connecting member to pivot the seat upward about the base member to a rear access position defined by the cushion facing forward.

2. The vehicle seating assembly of claim 1, further comprising:
   a support member having a first end slidably coupled with a central portion of the bottom link and a second end pivotally coupled with the rear bracket.

3. The vehicle seating assembly of claim 2, wherein the bottom link includes a slot, and the first end of the support member includes a protrusion that slidably engages the slot, wherein the protrusion slides forward in the slot when the linkage collapses to the stowed position.

4. The vehicle seating assembly of claim 2, wherein the second end of the support member includes a groove and the rear bracket includes a peg that slidably engages the groove, wherein the peg slides upward in the groove when the seat moves to the rear access position.

5. The vehicle seating assembly of claim 1, further comprising:
   a latch assembly detachably coupling the connecting member with the rear link when the seat is in the upright position.

6. The vehicle seating assembly of claim 5, wherein the latch assembly is operably coupled with a manual actuator to move the latch assembly between a closed position and an open position, allowing the connecting member to detach the rear link for moving the seat to the rear access position.

7. The vehicle seating assembly of claim 1, wherein the base member is spring-biased forward about the front bracket for raising the seat to the upright position from the stowed position.

8. A vehicle seating assembly comprising:
   a seatback pivotally coupled with a slidable rear bracket;
   a seat having a four-bar linkage;

a base member pivotally coupling a front link of the linkage with a fixed front bracket;

a connecting member pivotally coupling a bottom link of the linkage with the seatback, wherein pivoting the seatback forward collapses the linkage, and wherein sliding the seatback forward rotates the linkage forward; and a latch assembly detachably coupling the connecting member with a rear link of the linkage when the seat is in an upright position.

9. The vehicle seating assembly of claim 8, further comprising:

a manual actuator operably coupled with the latch assembly and configured to move the latch assembly between a closed position and an open position, wherein the connecting member is configured to detach the rear link thereby allowing movement of the seat to a rear access position.

10. The vehicle seating assembly of claim 8, further comprising:

a manual actuator on the seatback that is configured to detach the connecting member from a rear link of the linkage thereby allowing the seatback to slide forward to a rear access position.

11. The vehicle seating assembly of claim 8, wherein the rear bracket includes a track assembly for sliding the seatback forward and rearward.

12. The vehicle seating assembly of claim 8, wherein the base member pivotally couples with an intermediate portion of the front link, such that sliding the seatback forward causes the connecting member to pivot the seat upward about the base member to a rear access position.

13. The vehicle seating assembly of claim 8, further comprising:

a support member having a first end slidably coupled with a central portion of the bottom link and a second end pivotally coupled with the rear bracket.

14. The vehicle seating assembly of claim 13, wherein the bottom link includes a slot, and the first end of the support member includes a protrusion that slidably engages the slot, wherein the protrusion slides forward in the slot when the linkage collapses.

15. A vehicle seating assembly comprising:

a slidable bracket pivotally supporting a seatback;

a four-bar linkage including:

a top link supporting a cushion;

a bottom link having a connecting member pivotally coupling the seatback with the bottom link, wherein pivoting the seatback forward collapses the linkage rearward; and a front link having a base member pivotally coupling the front link with a fixed bracket, wherein sliding the seatback forward tips the cushion forward; and a latch assembly detachably coupling the connecting member with a rear link that pivotally couples a rearward portion of the top link with a rearward portion of the bottom link.

16. The vehicle seating assembly of claim 15, wherein the base member is spring-biased forward about the fixed bracket for raising the linkage when collapsed rearward.

17. The vehicle seating assembly of claim 15, further comprising:

a support member having a first end slidably coupled with a central portion of the bottom link and a second end pivotally coupled with the rear bracket.

18. The vehicle seating assembly of claim 15, further comprising:

a manual actuator operably coupled with the latch assembly and configured to move the latch assembly between a closed position and an open position, wherein the connecting member is configured to detach the rear link thereby allowing movement of the linkage to a rear access position when the cushion is raised and tipped forward.

\* \* \* \* \*